United States Patent [19]

Archer et al.

[11] Patent Number: 4,638,629
[45] Date of Patent: Jan. 27, 1987

[54] PROCESS FOR ELECTRIC POWER PRODUCTION USING A BIOGAS

[75] Inventors: David H. Archer, Pittsburgh; Frank I. Bauer, Perry Township, Perry County; Edward J. Vidt, Churchill Boro, all of Pa.

[73] Assignee: Westinghouse Electric Corp., Pittsburgh, Pa.

[21] Appl. No.: 841,670

[22] Filed: Mar. 19, 1986

Related U.S. Application Data

[63] Continuation of Ser. No. 668,591, Nov. 5, 1984, abandoned.

[51] Int. Cl.$^4$ ................................................ F02C 3/28
[52] U.S. Cl. .................................. 60/39.05; 60/39.12; 48/209
[58] Field of Search ................. 60/39.05, 39.12, 39.55, 60/39.58, 39.59; 48/128, 209; 55/258, 259, 267, 334, 361, 523, 525

[56] References Cited

U.S. PATENT DOCUMENTS

| | | | |
|---|---|---|---|
| 3,373,545 | 3/1968 | Christianson | 55/361 |
| 3,731,485 | 5/1973 | Rudolph et al. | 60/39.12 |
| 3,817,724 | 6/1974 | Ellis et al. | 48/209 |
| 4,150,953 | 4/1979 | Woodmansee | 60/39.12 |
| 4,169,059 | 9/1979 | Storms | 55/525 |
| 4,364,445 | 12/1982 | Weil | 48/209 |
| 4,398,931 | 8/1983 | Shevlin | 55/523 |

Primary Examiner—Louis J. Casaregola
Attorney, Agent, or Firm—Daniel C. Abeles

[57] ABSTRACT

Electric power is produced in an electric power generating combustion turbine using a biogas as fuel thereto, where a biogas, leaving a biomass gasification system at an elevated temperature of 650°–875° C. and containing tars, is partially cooled by injection of a spray of water thereto to a lower temperature of about 260°–555° but above that which would condense tars. The partially cooled biogas stream is then filtered to remove solid particulate matter therefrom and is directly charged as fuel to the electric power producing combustion turbine for the production of electric power.

7 Claims, 1 Drawing Figure

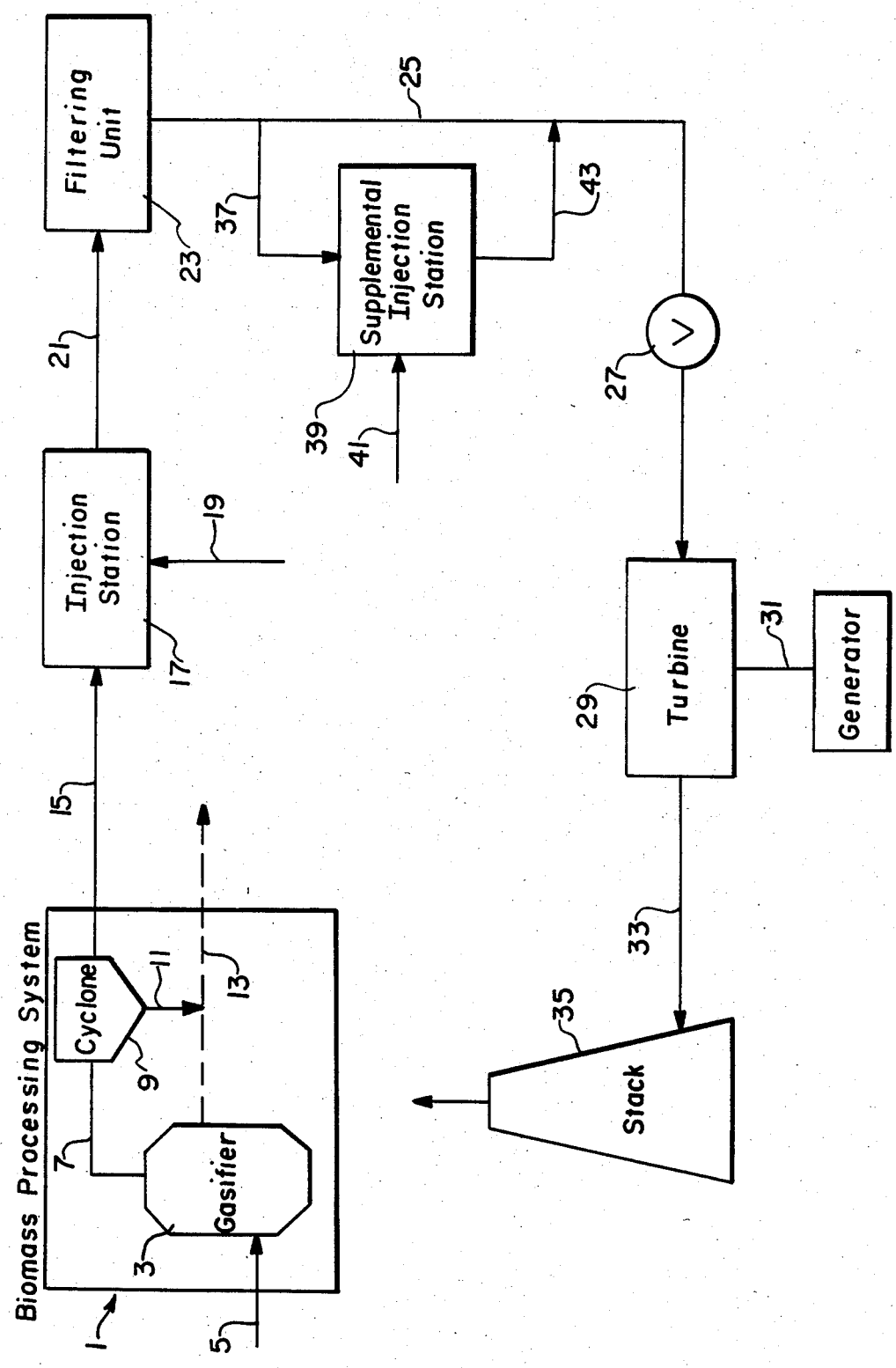

PROCESS FOR ELECTRIC POWER PRODUCTION USING A BIOGAS

This application is a continuation of application Ser. No. 668,591 filed Nov. 5, 1984, now abandoned.

BACKGROUND OF THE INVENTION

Various systems for the gasification of solid or heavy liquid fuels are known for the conversion of such fuels into fuel gases or light hydrocarbon liquids. Conventionally, the raw fuel gases produced require complex, energy consuming, and toxic waste producing processing in order to produce a clean gas for use in commercial equipment.

Systems which use the gasification of a biomass, or combustible plant material, such as wood, wood scrap, wood trimmings, leaves, wood waste, paper scrap, and the like, have been proposed since the fuel gas (biogas) produced is low in sulfur content relative to other fuels. This permits the fuel gas produced from such a biomass to be combusted as a fuel with only the removal of solid particulate matter therefrom. Conventionally, such systemss have proposed to clean the fuel gas by cooling the same in a heat exchanger and then filtering the gas. The heat exchanger and the filter are both likely to foul with tars and carbon carried in the fuel gas so that they would require frequent replacement. An example of an arrangement of a gasifier for electricity generation is described in "Appendix C, State of the Art in Biomass Conversions" of the report; Evaluation of Biomass Systems for Electricity Generation AP-2265, EPRI Research Project 1348-7, Final Report, February 1982, prepared by Battelle, Columbus Laboratories. In a gasification described therein, the Omnifuel gasifier converts wood wastes in a sand fluidized bed into low BTU gas. In that system, the product gas is passed through cyclones to remove solid particulate matter, through a heat exchanger, and then through a scrubber, before being used to generate electricity. The use of a scrubber in such a system poses a problem of disposal of the scrubber effluent which may contain toxic constituents.

As aforementioned, a fuel gas (biogas), produced by gasification of a biomass, is low in sulfur content and would permit combustion of such a gas with only particulate removal, provided the temperature of the biogas is reduced to levels tolerable by combustion turbines. For such conventional commercial turbines, those temperatures are in the 260°-555° C. range.

It is an object of the present invention to provide a process for producing electric power using a biogas producing system as a source of fuel for an electric power producing turbine, which does not require complex, energy consuming, and toxic liquid waste-producing processing of the biogas prior to its use as the fuel.

SUMMARY OF THE INVENTION

A process for producing electric power using a biogas as a fuel in a combustion turbine, wherein the biogas leaving a biomass gasification system, at temperatures in the range of 650°-875° C. and containing tar constituents, is partially cooled by injection of a spray of water thereto, to a predetermined temperature above which tar constituents would condense but suitable for use in a combustion turbine. The partially cooled gas is filtered by passage through a high temperature filter unit, to remove solid particulate matter therefrom, and the partially cooled, filtered biogas charged directly to an electric power producing combustion turbine to produce electric power. The water injected into the hot biogas stream preferably cools the same to a range of 260°-555° C., and the filter unit preferably contains either ceramic, porous metal, or high temperature bag filters which, since the tar constituents of the biogas are not condensed therein, are readily cleaned.

BRIEF DESCRIPTION OF THE DRAWING

The drawing is a schematic illustration of the present process for producing electric power from a biogas.

DETAILED DESCRIPTION

The present invention provides a process for the production of electric power, using a biogas as a fuel in an electric power producing turbine, wherein the biogas produced from a biomass in a gas generator is not subjected to a wet scrubbing step; and the biogas, after treatment according to the process, may be directly charged to an electric power producing combustion turbine.

In the present process, a biomass is first partially combusted to produce a biogas usable as a fuel. The biomass may comprise conventional biomasses such as wood, wood wastes, paper, combustible plant material such as leaves, shrubbery trimmings, and the like, as well as manure and peat. The partial combustion, or gasification of the biomass produces a biogas having a calorific value that is usable as a fuel. The actual processing unit used to gasify the biomass may be a conventional unit and such gasification units are known in the art. The processing system generally includes, in addition to a gasifier, a cyclone separator or other separator to remove a portion of solid particulate matter carried off by the biogas produced, as well as removal means for the ashes and residues from the gasifier.

Such processing systems produce a biogas that is discharged from the system at an elevated temperature of discharged from the system at an elevated temperature of about 650°-875° C., a temperature at which the biogas is not directly usable in a conventional electric power producing combustion turbine. The hot biogas also contains tars and residual particulate matter carried along with the biogas stream, which particulate material, such as char and ash, must be separated therefrom prior to use of the biogas in an electric power producing combustion turbine. Since most biomass is low in sulfur content, the biogas produced in the combustion system need not be subjected to a sulfur-removal step, provided the temperature of the biogas is reduced to levels tolerable by combustion turbines.

According to the present process, the hot biogas from the gasifier, at temperatures between 650°-875° C. is cooled to acceptable combustion turbine fuel inlet temperatures by the injection into the biogas stream of a predetermined amount of water, as a spray. The amount of water that is injected into the biogas stream is that sufficient to lower the temperature, by vaporization of the water, to a temperature of between about 260°-550° C., but above that temperature which would condense tars carried by the biogas stream. Generally, the biogas stream from the combustion system is at elevated pressure, on the order of 200-300 pounds per square inch (13.61-20.41 atmosphere), such that the water injected into the biogas stream must be presssurized to a pressure in excess of the presssure of the biogas stream to achieve injection and atomization of the spray of water thereto.

After injection of an amount of water to partially cool the biogas stream to the desired temperature range, a cooler temperature which will still maintain the tars in a vaporized state, the partially cooled biogas stream is passed through a filtering unit held at the elevated temperature of the partially cooled biogas stream. The filtering unit, which may comprise conventional high temperature filters such as ceramic filters, porous metallic filters, or high temperature bag filters, removes the residual particulate material from the partially cooled biogas stream, while still maintaining the tars, uncondensed, in the biogas stream.

The partially cooled, filtered, biogas stream, containing tars, is then directly charged to an electric power producing combustion turbine as a fuel. The flow of the partially cooled, filtered biogas to the electric power producing combustion turbine is, as is conventional, controlled by a valving system that will regulate flow of the biogas to the turbine, or other use, where excess biogas is present. Alternatively, the flow control valve may be replaced by a shutoff valve for emergency operation and the fuel gas flow modulated by controlling biomass and air flow to the gasifier. In the turbine, not only is the biogas usable as a fuel for power production, but the water present in the biogas will, in an expander of the combustion turbine system, provide additional power through expansion of the same.

The drawing is a schematic illustration of the present process, wherein a partial combustion system 1 contains a gasifier 3 that has charged thereto, through line 5, a biomass. The biomass is subjected to partial combustion in the gasifier 3, with a biogas produced, which biogas is passed through line 7 to a cyclone separator 9. Solids are separated and removed in cyclone separator 9 and combined by means of line 11, with ash or char from the gasifier in line 13 and removal from the partial combustion system 1. The biogas, at a temperature of between 650°–875° C. and is then discharged from the partial combustion system 1 through line 15. The hot biogas is passed from line 15 to an injection station 17, at which a spray of water from line 19 is dispersed in the hot biogas to partially cool the same to a temperature in the range of 260°–550° C., but at a temperature at which tars in the biogas stream remain uncondensed. The partially cooled biogas stream is then passed through line 21 to a filtering unit 23 that is also maintained at an elevated temperature that prevents the condensation of tars in the biogas stream. The partially cooled biogas stream, after passage through the filtering unit 23 is discharged through line 25 containing a valve 27, and directly charged to an electric power producing combustion turbine 29, which turbine operates a generator 31 to produce electric power. After passage through the turbine 29, the gas may be directly passed through line 33 to a stack 35 and discharged to the atmosphere.

If the temperature of the partially cooled, filtered, biogas in line 25 has not been partially cooled to the specific temperature that is desired for use in the turbine 29, the gas, or a portion thereof may be directed through a branch line 37 to a supplemental injection station 39. A spray of supplemental water is added through line 41 and dispersed in the partially cooled biogas to further partially cool the same to the desired specific temperature, and the further partially cooled biogas returned through branch line 43 to line 25 for use in the turbine 29.

In the present process, all of the heat content of the raw biogas is preserved either as sensible or latent heat of the vaporized water, for power production in the combustion turbine. The filtration is effected at a low enough temperature such that a negligibly small amount of alkali metal vapor will exist in the biogas and the filter unit and combustion turbine can both be fabricated from relatively inexpensive materials.

In the present process, the tar vapors, being maintained in the partially cooled, filtered biogas stream will not be condensed, avoiding fouling of components of the system. Also, the filter will be readily cleaned since tar droplets will not be present to foul the deposited solids in the filter either during normal filtration or during the stage of returning the filter to service after cleaning.

By avoiding the use of a heat exchanger as used in previous systems, with gas cooled by water spray attemperation as used in the present process, the avoidance of tube rupture problems a heat exchanger would impose is achieved. Such problems, as air leakage into the hot biogas if air were the cooling media, or large liquid water leakage into the hot biogas if water were the cooling medium are obviated.

We claim:

1. A process for the production of electric power with a biogas used as a fuel for an electric power producing combustion turbine which drives a generator, which turbine will accept such a biogas only at a temperature below a predetermined temperature, wherein a biomass is gasified to produce a hot stream of a biogas, said biogas being at temperatures of between about 650°–875° C. and containing vaporized tar components and solid particulate matter, characterized in that:

said hot stream of biogas, consisting essentially of a biogas, vaporized tars and solid particulate matter, has water injected thereto to partially cool the biogas to a temperature below said predetermined temperature by vaporization of said water, but above a temperature at which said vaporized tars in said biogas would condense out of said stream;

filtering said partially cooled biogas to remove said particulate matter; and directly charging said partially cooled, filtered biogas containing said vaporized water and vaporized tars to an electric power producing combustion turbine to produce electric power.

2. In a process for the production of electric power as defined in claim 1, the improvement wherein said hot stream of biogas is cooled by said water injected thereto to a temperature of between 260°–550° C.

3. In a process for the production of electric power as defined in claim 2, the improvement wherein said partially cooled biogas is filtered by passing the same through a filter unit containing ceramic filters.

4. In a process for the production of electric power as defined in claim 2, the improvement wherein said partially cooled biogas is filtered by passing the same through a filter unit containing porous metallic filters.

5. In a process for the production of electric power as defined in claim 2, the improvement wherein said partially cooled biogas is filtered by passing the same through a filter unit containing high temperature bag filters.

6. In a process for the production of electric power as defined in claim 2, the improvement wherein said hot stream of biogas is at a pressure of about 200–300 pounds per square inch at the time of injection thereto of said water.

7. A process for the production of electric power with a biogas used as a fuel for an electric power producing combustion turbine which drives a generator, which turbine will accept such a biogas only at a temperature below a predetermined temperature, wherein a biomass is gasified to produce a hot stream of a biogas, said biogas being at temperatures of between about 650°–875° C. and containing tar components and solid particulate matter, characterized in that:

said hot stream of biogas has water injected thereto to partially cool the biogas to a temperature below said predetermined temperature by vaporization of said water, but above a temperature at which tars in said biogas would condense out of said stream;

filtering said partially cooled biogas to remove said particulate matter;

injecting into at least a portion of said partially cooled, filtered biogas a supplementary spray of water to further partially cool said portion of said partially cooled, filtered biogas; and directly charging said partially cooled, filtered biogas to an electric power producing combustion turbine to produce electric power.

* * * * *